United States Patent [19]
McNair

[11] Patent Number: 5,450,491
[45] Date of Patent: Sep. 12, 1995

[54] AUTHENTICATOR CARD AND SYSTEM

[75] Inventor: Bruce E. McNair, Holmdel, N.J.

[73] Assignee: AT&T Corp., Murray Hill, N.J.

[21] Appl. No.: 112,165

[22] Filed: Aug. 26, 1993

[51] Int. Cl.⁶ .......................................... H04K 1/00
[52] U.S. Cl. ...................................... 380/25; 380/23
[58] Field of Search ............................. 380/23, 24, 25

[56] References Cited

U.S. PATENT DOCUMENTS

| | | | |
|---|---|---|---|
| 4,500,880 | 2/1985 | Gomersall et al. | 340/825.35 |
| 4,660,221 | 4/1987 | Dlugos | 380/23 |
| 4,678,896 | 7/1987 | Carlson et al. | 235/380 |
| 4,720,860 | 1/1988 | Weiss | 380/23 |
| 4,900,904 | 2/1990 | Wright et al. | 235/381 |
| 4,951,308 | 8/1990 | Bishop et al. | 379/91 |
| 4,962,531 | 10/1990 | Sipman et al. | 380/24 |
| 5,027,401 | 6/1991 | Soltesz | 380/23 X |
| 5,056,141 | 10/1991 | Dyke | 380/25 X |
| 5,146,499 | 9/1992 | Geffrotin | 380/23 |
| 5,149,945 | 9/1992 | Johnson et al. | 235/380 |
| 5,153,842 | 10/1992 | Dlugos et al. | 364/478 |
| 5,163,098 | 11/1992 | Dahbura | 380/23 |
| 5,177,789 | 1/1993 | Covert | 380/23 |
| 5,191,611 | 3/1993 | Lang | 380/25 |
| 5,193,114 | 3/1993 | Moseley | 380/23 |
| 5,202,921 | 4/1993 | Herzberg et al. | 380/23 |
| 5,204,663 | 4/1993 | Lee | 340/825.34 |
| 5,233,658 | 8/1993 | Bianco et al. | 380/25 |

OTHER PUBLICATIONS

"The 60 Second Password, Secure Computer Access; Security Dynamics"; 15 Dwight St, Boston, Mass., 1 page; 1984.

S. M. Matyas and C. H. Meyer "Cryptography: a New Dimension in Computer Data Security; a Guide for the Design and Implementation", Wiley, 1982, Table of Contents attached—also Chapter Three 'The Data Encryption Standard' pp. 113–191.

J. Millman and H. Taub "Pulse and Digital Circuits", McGraw-Hill Book Company, Inc., 1956—Table of Contents attached—also Chapter 13-10 Registers, pp. 411–412.

*Primary Examiner*—Tod R. Swann
*Attorney, Agent, or Firm*—Barry H. Freedman

[57] ABSTRACT

An authenticator card includes a liquid crystal display arranged to exhibit a dynamically changeable bar code pattern that represents an account number and, optionally, a PIN and/or expiration date. The card includes circuitry for periodically changing the bar code in accordance with a predetermined algorithm. When the card is presented by a user to a merchant to authenticate the identity of the user in connection with a business transaction, the bar code is scanned by a conventional bar code reader. The code is convened to electronic form and transmitted to a verification processor to be authenticated. During authentication, a corresponding algorithm is used to validate information from the received signal, enabling a database query to determine validity of the card. Advantageously, the card can be mass produced at low cost, and a readily available bar code scanner provides a simple interface when the card is presented for authentication.

9 Claims, 2 Drawing Sheets

AUTHENTICATOR CARD AND SYSTEM

FIELD OF THE INVENTION

This invention relates generally to an authenticator card which can be used to provide an indication that a person having possession of the card is authorized to engage in a transaction and a system for using the card, and, in particular, to such a card having a built-in time varying bar code display which can be discerned by automatic reading apparatus.

BACKGROUND OF THE INVENTION

A simple form of authenticator card available today is the standard "credit card" which includes an embossed, visibly discernible card number. The security of this type of card is easily compromised, since each time the card is used, the card number is made known to the merchant or vendor for validation purposes. It is then possible for the vendor to keep a copy of the card number and to thereafter pose as the card holder in subsequent transactions. The likelihood of this type of abuse can be somewhat diminished by including machine readable information in the magnetic stripe on the card. However, a copy of the information on the magnetic stripe can also be made and retained by the vendor, albeit with additional difficulty. As an alternative, the cardholder can be provided with a personal identification number (PIN) which is associated with the card and which is neither printed on the card in visibly discernible form nor included in the magnetic stripe. If the card itself is misappropriated, the PIN would not be known to the unauthorized user. However, the PIN would be given to and known by a merchant when the card holder initiates a transaction. It is also possible for the PIN to be misappropriated by a person who overhears a transaction or observes the cardholder as the PIN is written or entered via a keyboard or by the vendor to whom the customer gives the PIN to authorize themselves.

In order to avoid all of the problems just described, a more complex form of authenticator card including an account number with a time varying, random component, has been proposed in U.S. Pat. No. 5,146,499 issued to B. Geffrotin on Sep. 8, 1992. This kind of card is known as a "smart card", in that it includes a microcomputer and a self-contained memory. Information contained in such a smart card must be read with a specialized reader, which can be quite expensive and which provides a rather cumbersome user interface. Thus, such readers have not achieved widespread availability, and have not thus far been popular with merchants and users of authenticator cards.

SUMMARY OF THE INVENTION

In accordance with my invention, an authenticator card includes a liquid crystal display arranged to exhibit a dynamically changeable bar code pattern that represents an account number and, optionally, a PIN and/or expiration date. The card includes circuitry for periodically changing the bar code in accordance with a predetermined algorithm. When the card is presented by a user to a merchant to authenticate the identity of the user in connection with a business transaction, the bar code is scanned by a conventional bar code reader. The code is converted to electronic form and transmitted to a verification processor to be authenticated. During authentication, a corresponding algorithm is used to validate information from the received signal, enabling a database query to determine validity of the card. Advantageously, the card can be mass produced at low cost, and a readily available bar code scanner provides a simple interface when the card is presented for authentication.

BRIEF DESCRIPTION OF THE DRAWINGS

The present invention will be fully appreciated by consideration of the following detailed description, which should be read in light of the accompanying drawing in which.

DETAILED DESCRIPTION

Figure 1:
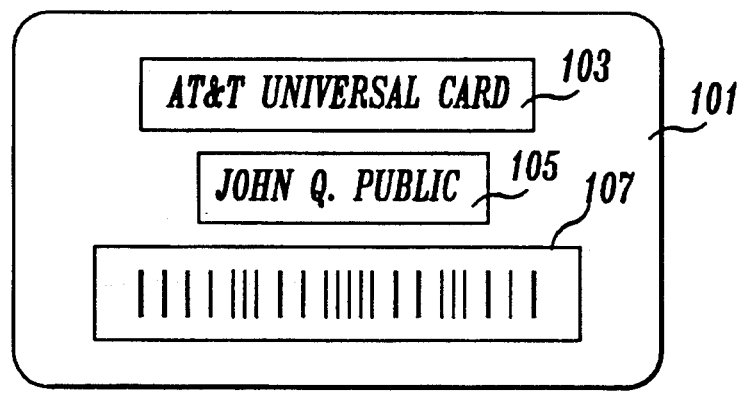
FIG. 1 illustrates the external arrangement of an authenticator card with a liquid crystal display, in accordance with the present invention.

Turning first to FIG. 1, there is shown the external arrangement of an authenticator card with a liquid crystal display for displaying a time varying bar code. A plastic card body 101 the size of a conventional credit card may include a first area 103 carrying an imprint identifying the card issuer and a second area 105 indicating the name of the card holder. The information in areas 103 and 105 may be printed or embossed. The account number of the card is not imprinted on the card, since an imprinted or embossed account number is static (fixed). In order to obtain an account number that is dynamic (time varying), the card includes a liquid crystal display (LCD) 107 controlled by electronic circuitry described below in connection with FIG. 2. LCD 107 is arranged in accordance with the invention to display a bar code, i.e., a series of generally parallel stripes having differing widths and spacings set out on a contrasting background. (The stripes can be dark and the background light, or vice-versa.) The bar code represents the account number associated with the card and, optionally, a PIN and an expiration date. Information carried by a bar code is readily decoded in accordance with published standards; see INTERMEC Code 39 Alphanumeric Bar Code Specifications, January 1982, Interface Mechanisms, Inc. The use of a liquid crystal display for the purposes of displaying a bar code is described in U.S. Pat. No. 5,153,842 issued to Robert Chen et al. on Oct. 6, 1992.

Figure 2:
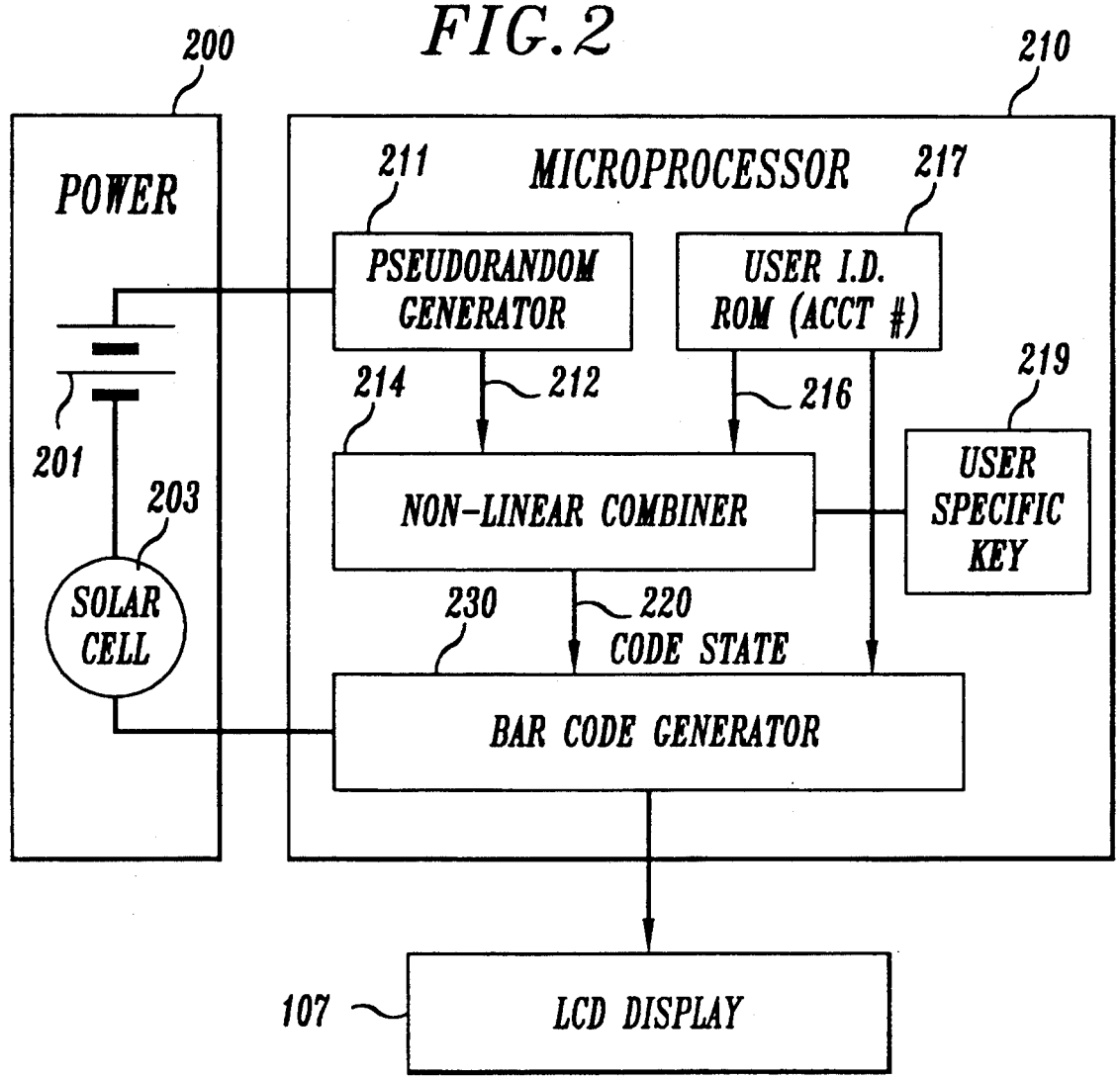
FIG. 2 is a block diagram of the circuitry within the authenticator card of FIG. 1.

FIG. 2 is a block diagram of the circuitry within the authenticator card of FIG. 1. Power for the electronic components is derived from a power module 200, including a battery 201 and/or a solar cell 203. The "brain" in the card is a processor shown generally as 210, that is powered by power module 200. Processor 210 may be implemented as an integrated circuit that in:cludes a memory and microcode for controlling a microprocessor. Together, the components in processor 210 perform the several functions that are illustrated in FIG. 2 and described below. A pseudorandom code generator 211 is arranged to provide a dynamic (time variable) codeword on line 212, which has a value that periodically changes as a function, for example, of the time of day. An equivalent dynamic codeword must also be available at the central verification site (discussed hereinafter) when the information in the card is verified or authenticated. Any other dynamic (time varying) and repeatable (reproducible) function can also be used in lieu of time of day: examples are the state of a cryptographic device (see S. M. Matyas and C. H. Meyer, "Cryptography: a New Dimension in computer Data Security; a Guide for the Design and Implementation", Wiley, 1982) or a linear or non-linear feedback shift register (see e.g., J. Millman and H. Taub, "Pulse and Digital Circuits", McGraw-Hill Book Company, Inc., 1956).

The dynamic codeword on line 212 is applied to one input of a non-linear combiner 214; a second input to non-linear combiner 214 is a fixed codeword input on line 216 representing a unique user ID or account number associated with the authenticator card. The ID number is stored in an internal read-only memory (ROM) 217. A third input to non-linear combiner 214 on line 218 is a user specific key (corresponding to a PIN for the card user) which may also be stored in an internal read-only memory (ROM) 219.

Non-linear combiner 214 is arranged to combine the fixed and dynamic codewords available on lines 212 and 216, as a function of the user specific PIN output from ROM 219 on line 218, in accordance with a non-linear combining algorithm, so as to generate a multibit codeword output: on line 220 which (a) uniquely represents the particular authenticator card and (b) which changes over time. The combining algorithm can, for example, implement the DES encryption algorithm, a secure hashing algorithm, or any other similar combinatorial technique for generating a dynamic authenticator code. The essential characteristic of non-linear combiner 214 is that the output code state on line 220 is jointly dependent on several inputs, namely the code word output from pseudorandom code generator 211 on line 212, the user account number output from ROM 217 on line 216, and the user specific key in ROM 219. The output code state is related to these inputs in accordance with a complex, non-linear, non-invertible function or relationship. Methods of creating such functions are well known in the cryptographic art. In the case of the DES algorithm, the signals on lines 212 and 216 together represent the data to be encrypted, and the signal on line 218 represents the encryption key. The particular non-linear or cryptographic algorithm would be under the control of a secret device. Clear text/cipher text comparisons of a random value can also be used.

The multibit codeword output from non-linear combiner 214 on line 220 as well as the user ID stored in ROM 217 are applied to a bar code display generator 230, in order to generate the parameters for a bar code display that represents both signals. Note here that while the overall bar code display is time varying, since at least portions of the code generating the display change with time, portions of the code display are static, since portions of the code that generate the display are fixed. Specifically, the portion of the display attributable to the user ID stored in ROM 217 does not change with time; the portion of the display attributable to the multibit codeword output from non-linear combiner 220 does change with time. The dynamic and static portions of the display can be "integrated", so that the casual observer does not recognize which portion is which. For example, the bits of the multibit codeword output from non-linear combiner 214 can be interleaved with the bits from the user ID stored in ROM 217, so that alternate parts of the display are dynamic, and the remainder is static. As another example, a specific part (e.g., the leftmost portion) of the display may correspond to the user ID, and the balance of the display may correspond to the multibit codeword output from non-linear combiner 214. In either event, bar code display generator 230 generates signals for LCD 107 to cause it to display wide or narrow bars in accordance with the INTERMEC Specification previously referred to. The output of bar code display generator 230 is in turn applied to LCD 107 in the authenticator card, so that a bar code is visible and can be scanned when the card is presented during a transaction.

Note here that various modifications can be made to the card. For example, the bar code display can be turned on only when needed, and otherwise maintained in a suspended state, in order to conserve battery life. Also, the card can include an arrangement to allow reprogramming, so that, for example, the unique user ID code stored in ROM 217 and/or the user specific key (PIN) stored in ROM 219 can be changed by external means.

Figure 3:
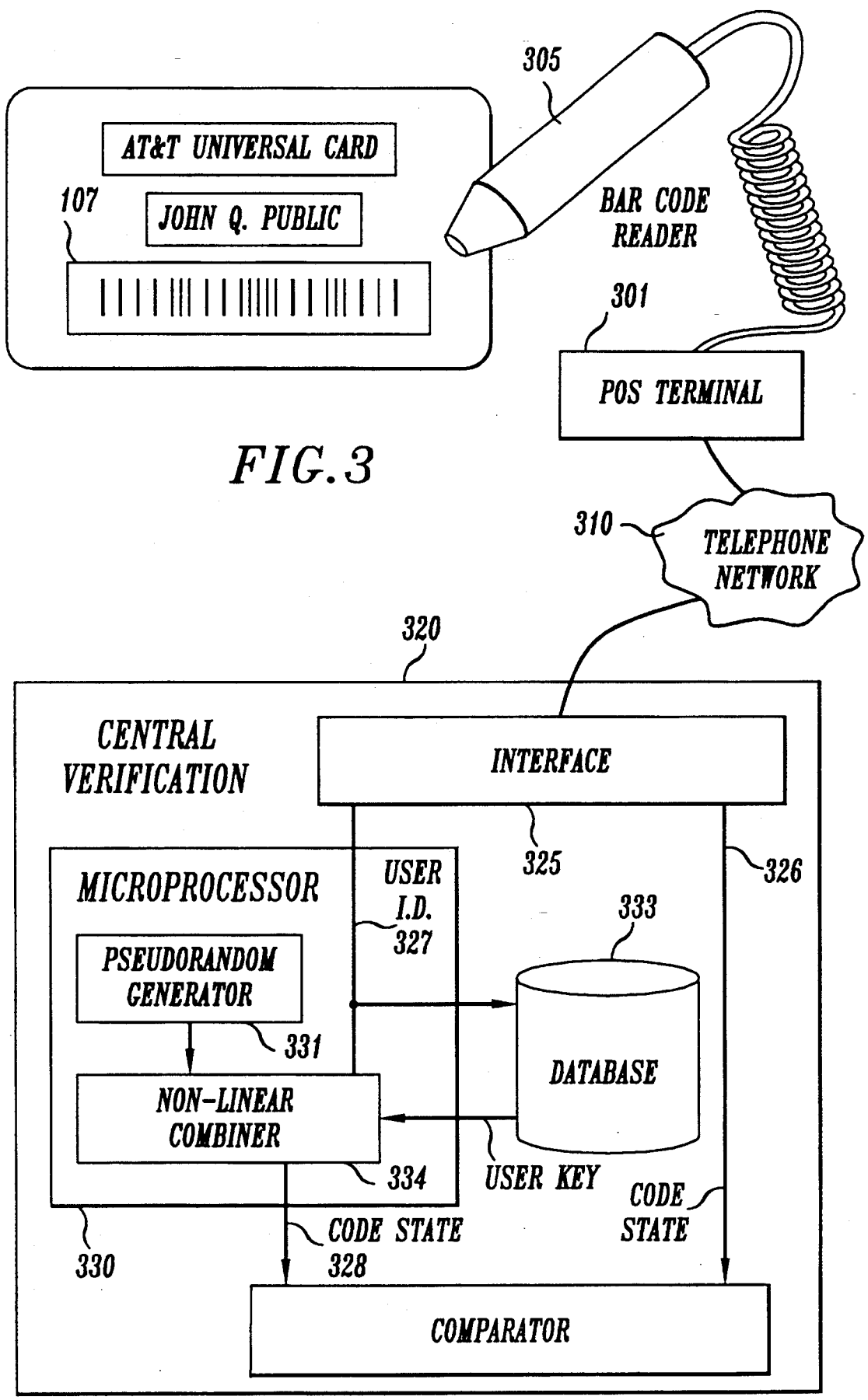
FIG. 3 is a block diagram of a system using the authenticator card of the present invention in connection with a transaction at a point of sale terminal.

Turning now to FIG. 3, there is shown a block diagram of a system for using the authenticator card of FIG. 1 in validating a transaction at a point of sale (POS) terminal 301. POS terminal 301 is outfitted with a conventional bar code reader 303, which receives its input from a bar code scanner 305. When the LCD 107 on the authenticator card is scanned with scanner 305, a digital signal representing the bar code displayed on the card at that time is received in POS terminal 301. A version of this signal is transmitted via telecommunications network 310 to a central verification site 320, which includes an interface 325. Interface 325 is arranged to recover or separate the individual static and dynamic components of the scanned bar code. The static component, represented by an output of interface 325 on line 327, may be obtained by segregating alternate bits, if the static and dynamic components were interleaved. This component represents the user ID contained in ROM 217. The dynamic component, represented by an output of interface 325 on line 326, may then be obtained from the remaining bits. This component, which represents the multibit codeword output from non-linear combiner 214, is applied to one input of a comparator 340 discussed below. Other recovery techniques would be used, depending upon the manner in which the two inputs to bar code display generator 230 were used to generate the bar code display on LCD 107.

Central verification site 320 includes a processor 330, which, like processor 210, is implemented in an intergrated circuit including a microprocessor operating in accordance with microcode in order to provide various functions similar to those performed in processor 210. More specifically, processor 330 includes a pseudorandom code generator 331 arranged to operate in a manner identical to pseudorandom code generator 211 of FIG. 2, and a non-linear combiner 334 arranged to operate in a manner identical to non-linear combiner 214 of FIG. 2. (Thus, in the case of an encrypter, the encryption algorithm used in non-linear combiner 334 is the same as the encryption algorithm used in non-linear combiner 214.) Central verification site 320 also includes a database 333, which stores the user specific key (PIN) provided to and associated with the user ID assigned to each user of an authenticator card.

As stated previously, the signal on line 327 represents the static component of the bar code, and thus represents the received version of the user D contained in ROM 217. This signal is applied directly to a first input to non-linear combiner 334, and also to database 333, so as to retrieve the user specific key associated with that user D. The user specific key is applied to a second input of non-linear combiner 334. The third input to non-linear combiner 334 is received from pseudorandom code generator 331, which, as stated previously, is assumed to be identical to pseudorandom code generator 211, so that the same output is obtained at the same time.

From the above discussion, it is seen that the three inputs to non-linear combiner 334 will be identical to the three inputs to non-linear combiner 214 of FIG. 2 at any given time that the authenticator card is used to authenticate a transaction, provided that (a) pseudo random generator 331 is properly synchronized with and produces the same output as pseudorandom code generator 211, and (b) the user ID applied to database 333 produces that same user specific key as the one output from ROM 219 on line 218. If these conditions are met, the: authenticator card is valid, and the output of non-linear combiner 334, when compared with the multibit codeword on line 328, in a comparator 340, will be the same. On the other hand, if there is a difference, the comparison will fail, indicating an invalid authenticator card.

If the authenticator card is valid, POS terminal 301 is signaled, so that the transaction may proceed. Otherwise, the transaction may be halted, or the authentication retried in the case of transient errors.

Various modifications of the present invention are possible. For example, the output of pseudorandom code generator 211 could also be a direct input to bar code display generator 230, so that a portion of the code display could also be time-varying and indicate that code directly. In that case, interface 325 would be arranged to extract that component of the received signal, and the central verification site would be arranged to apply the received pseudorandom component to the comparator. As another alternative, the user specific key could be eliminated for simplicity. Also, in the embodiment described above, authentication of the validity of the card is based on the ability to match two independently generated dynamic authentication values, i.e., the one code state on line 220 generated in the card 101 and the one code state output from interface 325 on line 326 generated in the central verification apparatus. In a different arrangement, LCD 107 could be read at the POS terminal 301, transmitted through telephone network 310 and, based upon the user ID on line 327, the received code could be decrypted by a function that is the cryptographic inverse of the function used for encryption in non-linear combiner 214. Such inverse encryption operations are well known in the field of cryptography, as described in the Matyas-Meyer reference cited above. Accordingly, it is intended that the invention be limited only by the appended claims.

I claim:

1. An authenticator system for authenticating the identity of a user having possession of an authenticator card, said system comprising
   means for generating a pseudorandom, time varying code;
   means responsive to said code generating means for converting said time varying code to a bar code;
   means for displaying said bar code on an LCD display on said authenticator card; and
   means for scanning said bar code at the time said authenticator card is used by said user to authenticate the identity of said user.

2. The invention defined in claim 1 wherein said code generating means is arranged to generate said time varying code as a function of the time of day.

3. The invention defined in claim 1 wherein said code generating means is arranged to generate said time varying code as a joint function of the time of day and of an encryption key.

4. The invention defined in claim 1 wherein said bar code is a series of generally parallel stripes of varying widths and separations displayed on a contrasting background.

5. A system for authenticating the identity of a user, comprising
   an authenticator card arranged to display a dynamically changing bar code that varies in accordance with a pseudorandom code;
   means for scanning said bar code at the time said authenticator card is used by said user;
   means for applying information derived from said scanned bar code and information generated in accordance with said pseudorandom code to a processor to obtain a unique user ID for said authenticator card; and
   means for comparing said unique user ID with stored information to authenticate the identity of said user.

6. The invention defined in claim 5 wherein said display includes an LCD display.

7. The invention defined in claim 5 wherein said authenticator card includes means for generating said dynamically changing bar code, comprising:
   means for generating a pseudorandom, time varying code; and
   means responsive to said code generating means for convening said time varying code to a bar code.

8. A method for authenticating the identity of a user through possession of an authenticator card, said method comprising the steps of:
   generating a pseudorandom, time varying code;
   converting said time varying code to a bar code;
   displaying said bar code on an LCD display contained on said authenticator card; and
   scanning said bar code at the time said authenticator card is used by said user to authenticate the identity of said user.

9. A method for authenticating the identity of a user, comprising the steps of:
   displaying a dynamically changing bar code that varies in accordance with a pseudorandom code on an authenticator card of said user;
   scanning said bar code at the time said authenticator card is used by said user;
   applying information derived from said scanned bar code and information generated in accordance with said pseudorandom code to a processor to obtain a unique user ID for said authenticator card; and
   comparing said unique user ID with stored information to authenticate the identity of said user.

* * * * *

UNITED STATES PATENT AND TRADEMARK OFFICE
CERTIFICATE OF CORRECTION

PATENT NO. : 5,450,491

DATED : September 12, 1995

INVENTOR(S) : Bruce E. McNair

It is certified that error appears in the above-identified patent and that said Letters Patent is hereby corrected as shown below:

```
Title page, item [57],
```
Abstract, line 10, "convened" should read --converted--.

Column 3, line 64, "the :bits" should read --the bits--.

Column 4, line 68, "user D" should read --user ID--.

Column 5, line 4, "user D" should read --user ID--.

Column 5, line 22, "the :authenticator" should read --the authenticator--.

Signed and Sealed this

Thirtieth Day of January, 1996

*Attest:*

BRUCE LEHMAN

*Attesting Officer*      *Commissioner of Patents and Trademarks*